No. 864,430. PATENTED AUG. 27, 1907.
F. H. RICHARDS.
TYPOGRAPHIC MACHINE.
APPLICATION FILED DEC. 24, 1900.

Witnesses.
A. B. Mattingly.
F. W. Hartland.

Inventor.
F. H. Richards.

No. 864,430. PATENTED AUG. 27, 1907.
F. H. RICHARDS.
TYPOGRAPHIC MACHINE.
APPLICATION FILED DEC. 24, 1900.

Witnesses:—

Inventor;

No. 864,430.  
PATENTED AUG. 27, 1907.  
F. H. RICHARDS.  
TYPOGRAPHIC MACHINE.  
APPLICATION FILED DEC. 24, 1900.  
6 SHEETS—SHEET 6.

Witnesses:  
A. Roy Appleman  
F. W. Haviland

Inventor,  
F. H. Richards.

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

TYPOGRAPHIC MACHINE.

No. 864,430.      Specification of Letters Patent.      Patented Aug. 27, 1907.

Application filed December 24, 1900. Serial No. 40,853.

*To all whom it may concern:*

Be it known that I, FRANCIS H. RICHARDS, a citizen of the United States, residing at Hartford, in the county of Hartford and State of Connecticut, have invented certain new and useful Improvements in Typographic Machines, of which the following is a specification.

This invention relates to typographic machines of that class in which the impression devices consist of wheels or rolling impressors capable of a double circuital movement, one in an orbital or closed circuit path and the other a movement of rotation about the several axes of the impressors.

An object of the present invention is to furnish a machine of this class which may be provided with a large number of characters and is adapted for making a large number of impressions, while keeping the size and mass of the impression mechanism relatively small and capable of operation at a high velocity.

In carrying out my invention a plurality of impression devices or rolling impressors are employed capable of an axial or endwise movement toward and away from a fixed plane. To permit of this movement and other motions of which they are capable, the impression devices are conveniently carried upon shafts which extend toward the right hand and toward the left hand. When the wheel or impression device carried upon any particular shaft is to be operated this shaft when it is started rotating (or at some other time before an impression is made) is shifted lengthwise or axially to its proper axial working position, and after the impression has been made the shaft is returned to its original or inoperative axial position. A similar operation takes place when another of the impression devices carried by an oppositely-extending shaft is to be used; to use this latter device therefore the actuating shaft is given a longitudinal movement so as to bring the impression device carried by it into the same plane or operative axial position previously occupied during its own period of operation by the first-mentioned impressor. For permitting this mode of operation a space is provided between the planes in which the closed circuit or orbital paths of the impressors are described when in idle or inoperative axial positions, into which space an impressor is shifted when it is desired that an impression shall be made.

The invention embodies also in combination with the foregoing a set of selective devices whereby a particular type or die upon any impressor may be caused to perform its function to the exclusion of all others, the operation of any type or die being therefore under control.

The invention has for an object also to furnish an effective means for obtaining a feeding movement of the material upon which the various types or dies operate or are impressed beside including certain other devices, features, and combinations of parts, all described in the following specification with the aid of the accompanying drawings in which.

Similar characters of reference designate corresponding parts in all the figures.

An organization is shown adapting the features of the invention to use in a typewriter-machine, but the invention is not limited, it will be understood, to such particular embodiment being applicable in whole or in part as respects its various features to typographic machines in general, or machines in which an impression device is designed to operate upon or affect a certain surface.

Figure 1:
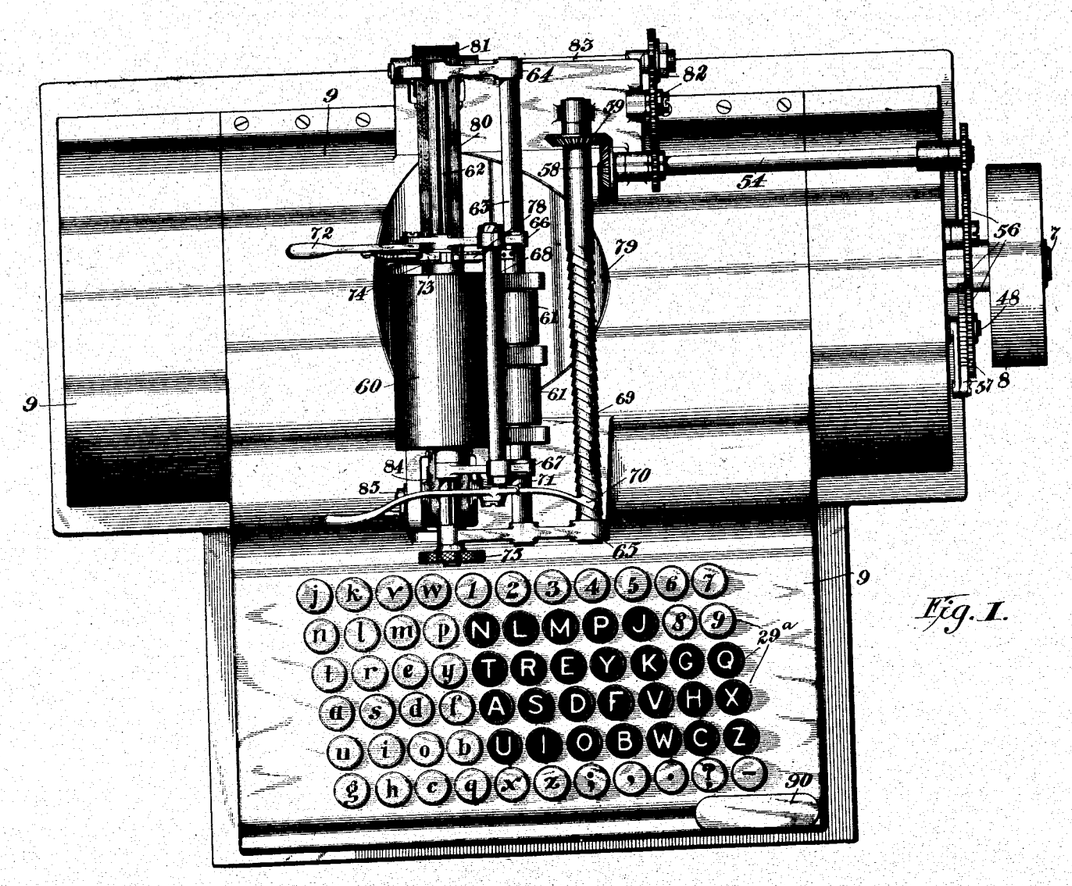
Figure 1 is a plan view of a machine embodying my invention.
Figure 2:
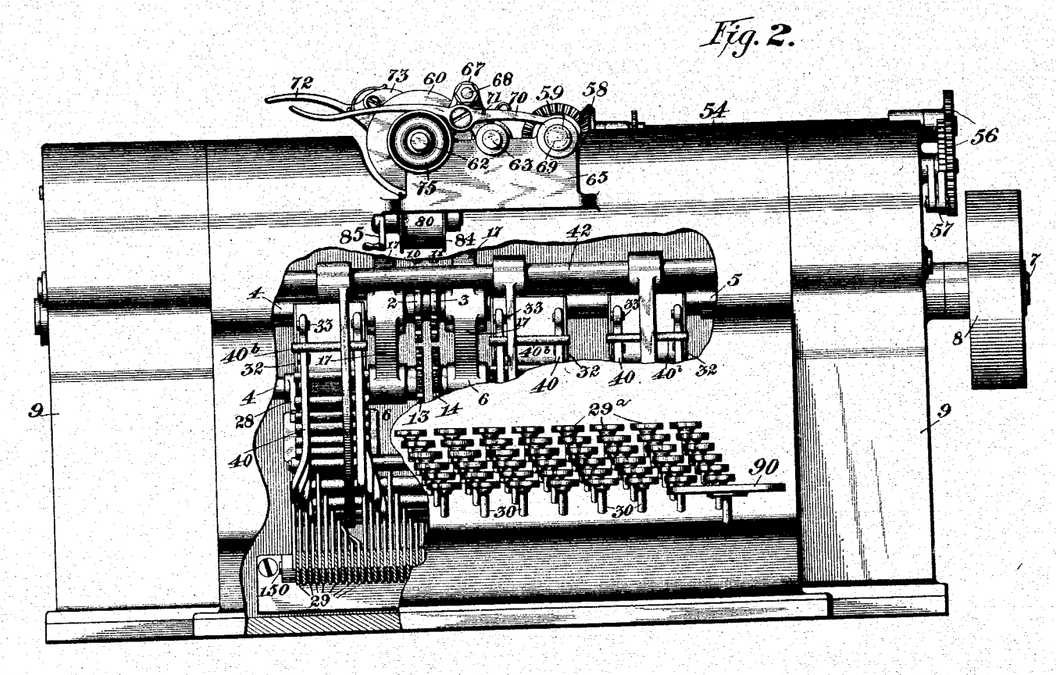
Fig. 2 is a front elevation thereof, parts being broken away the better to show the parts lying beyond.
Figure 6:
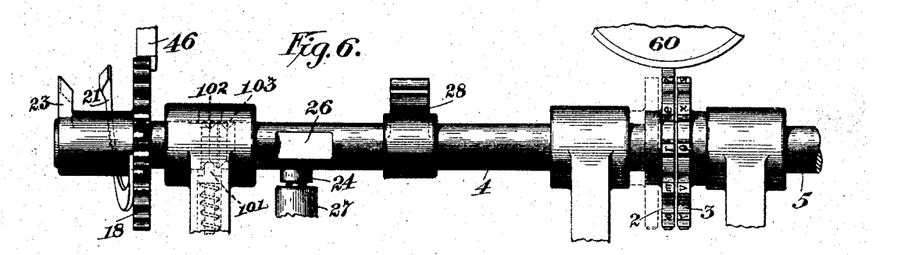
Fig. 6 is an enlarged view of a pair of impressors and certain associated parts, one of the impressors being shown in its operative axial position and the other in a similar inoperative position in full lines, while the inoperative axial position of the former is indicated in dotted lines.
Figure 7:
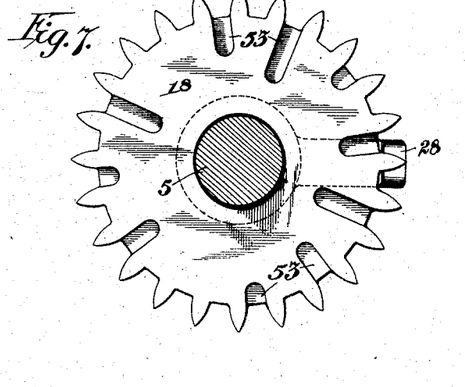
Figs. 7 and 8 are enlarged side and edge views, respectively, of a feed-wheel involved in the machine.
Figure 8:
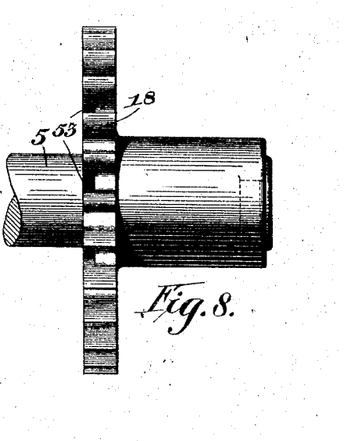

The impression devices of this invention are rotary or rolling impressors consisting of one or more parts provided with one or more impression types or dies. These parts (which will hereinafter be generally referred to as impressors) are in this invention disposed normally or when inoperative on opposite sides of a fixed plane (hereinafter referred to as the operative plane). Two such impressors are shown in Figs. 2 and 6 and designated by the numbers 2 and 3.

Figure 4:
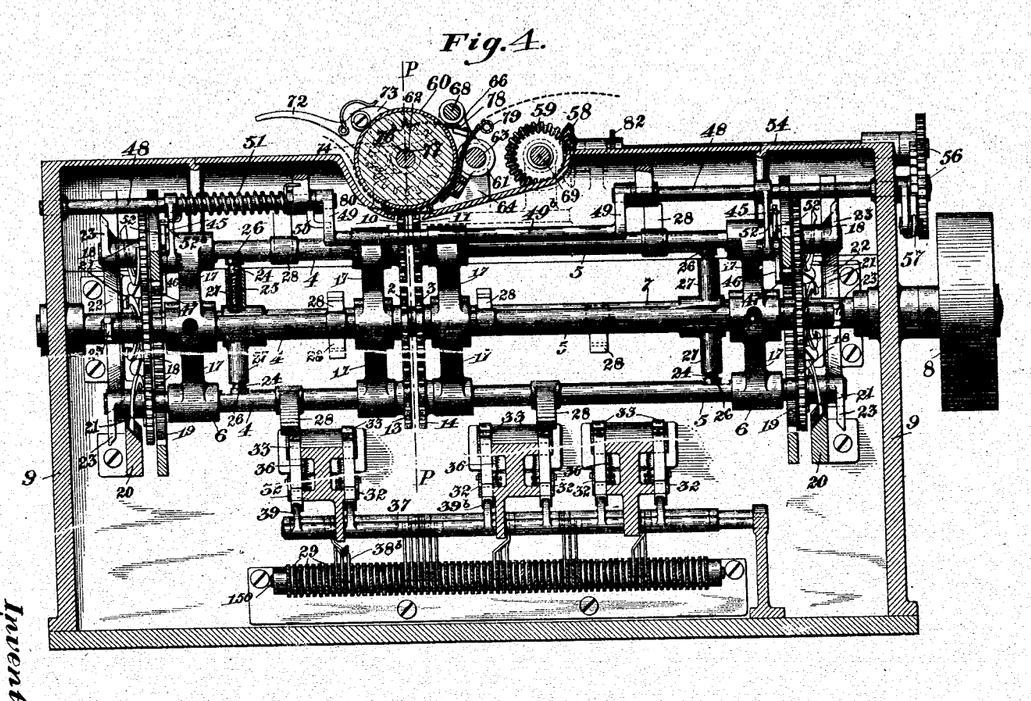
Fig. 4 is a longitudinal section of the machine taken on the planes of the broken line *a—a* of Fig. 3.
Figure 5:
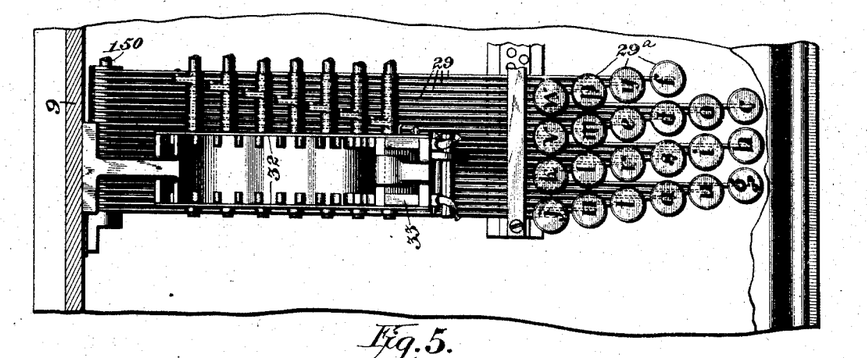
Fig. 5 is a plan of a part of the key-board showing a view of a latch mechanism frame.

Normally, if two impressors are arranged directly opposite each other, as shown in this particular case, they are separated a space at least sufficient to permit either impressor to be shifted lengthwise of its axis of rotation toward the other into the same position relative to the operative plane, (see line P—P, in Fig. 4). In any event, the distance of each impressor from the operative plane will be such that when an impressor is shifted from its inoperative axial position on one side of said plane into its operative axial position therein it will not interfere with an inoperative impressor on the other side of the plane. Considering any two impressors upon opposite sides of the plane, they are preferably affixed to shafts 4 and 5, extending upon opposite sides of the operative plane and fitted to their bearings to permit of their endwise or axial movement.

The impressors are adapted to have both a closed circuit or orbital motion whereby they are carried periodically past a given point or points and at times a rotary motion about their own axes. In the particular instance illustrated, this closed circuit or orbital movement is a movement of revolution about an axis exterior to themselves, and to enable their particular double motion to be effected the shafts 4 and 5 carrying the impressors 2 and 3, respectively, are shown mounted in a turret, or rotary carrier 6, which may be rotated by a shaft 7, through the medium of a pulley or band wheel 8. The bearings of this shaft 7 are supported by a suitable fixture or fixtures, which, in the present instance, is constituted by the protecting casing 9, inclosing the mechanism. Such a number of impressors as are desired may be arranged in pairs as shown and mounted upon the turret 6 within the limits of the latter, the impressors bearing types or dies upon their peripheries and being affixed to appropriate shafts; the impressors 3 and 2, already described, and the impressors 10 and 11, 13 and 14, 15 and 16, (not shown) more or less as deemed necessary. Their respective shafts 5 and 4 may be journaled in arms 17 extending from and secured to the shaft 7 and forming with the latter the turret designated generally by 6.

While the sets 5 and 4 of oppositely-extending shaft have been described as mounted in a turret, it is apparent, that with equal propriety the name turret may be applied separately to each system of arms 17 and connecting shaft supporting a set of impressor shafts. Moreover these two sets of shafts may be independently driven either at the same speed or at different speeds. In using the term turret, or rotary carrier, therefore I wish to include all such modifications in construction and operation.

As before mentioned, each shaft 5 and 4 is adapted to have a rotary motion imparted to it in addition to the orbital motion it may have by virtue of the rotation of the turret 6, and for this purpose to each shaft there may be secured a gear or toothed wheel 18, which may engage at times with an internal driving gear 19, one for each set of oppositely-extending shafts and here shown as being secured to the casing 9. This construction affords a convenient and positive means when the driving gear is engaged for effecting a rotation of each gear wheel 18. The endwise or axial movement of each shaft 4 and each shaft 5 for bringing the corresponding impressor into and withdrawing it from the operative plane is utilized for engaging the respective gear with and disengaging it from the corresponding driver 19. To effect this endwise movement there may be combined with each set of oppositely-extending shafts 4 and 5, an actuating member, or cam, 20, with which coacts an actuating or cam arm 21 on each shaft normally in a position to be free of said cam 20 but brought by the initial rotation of the shaft to which it is attached into a position to coact therewith and shift the shaft forward and bring the corresponding impressor into the operative plane. For returning the shaft there may be an actuating member or cam 22 for each set of shafts with which coacts an actuating or cam arm 23 projecting from each shaft which accomplishes the shifting of the shaft backward and the withdrawal of the corresponding impressor from said operative plane as the turret rotates. Each arm in one of these two sets of cam arms 21 and 23, the arms 21, are here shown to have their operating surfaces formed at the ends of flexible or spring-like strips. This method of supporting them will suppress the violence of the shock when the parts come in contact. It will be manifest that since the two sets of shafts move in opposite directions in approaching the operative plane and in opposite directions when they recede therefrom, the cams 20 and 22 for each set will face oppositely.

The cams 20 and 22 for each set may be attached to the casing 9, and are located in the proper positions to coöperate with their co-acting arms, while the distance each causes a shaft to move endwise is not sufficient to carry the co-acting arm on that shaft of the adjacent cam beyond the point where contact of this arm will take place with its cam. The two cams 20 and 22 for each set of shafts are arranged on diametrically opposite sides of the circle in which the cam arms move, producing as a result a movement of a shaft backward and forward when initially rotated in the manner described below for each rotation of the turret 6.

Each of the shafts 4 and 5 will be provided with some form of device for resisting to a considerable degree an axial movement thereof. For instance, a spring-pressed detent 101 may be urged into either one of two grooves 102 and 103 corresponding to the two axial positions of the shaft. If the sides of these grooves are made slanting and the detent corresponds in form, the pressure inward of the detent will cause a degree of end thrust in the shaft tending to complete the operation of the shifting cams. Some form of a precision brake for stopping the rotation of a shaft when its gear wheel 18 has been thrown out of engagement with the driving gear 19 will also be provided.

The device shown in the present instance comprises a plunger 24 pressed outward by a spring 25, against a facet 26 upon the shaft. The plunger works in a cylinder 27, formed in a fitting extending from the shaft 7.

For initiating the rotary movement of the shafts in the two sets, each shaft is provided with a starting arm 28, operating substantially in the manner as set forth in Patents Nos. 401,371 and 573,620, granted to me on April 16, 1889, and December 22, 1896, respectively, which may be consulted for a detailed description of its construction and mode of operation. The starting arm 28 on each shaft may be arranged in a different transverse plane to that of the starting arm on any other shaft for a purpose that will be explained later.

Referring now to certain selective devices, whereby the rotation of a particular shaft 4 or 5 may be commenced and whereby the amounts of such rotation that will occur from the time rotation has commenced up to a fixed point where an impression device is to operate shall be under control, these results may be best attained by the employment of a series of latch mechanisms, the tripping of any one of which will cause a reciprocating latch or bolt to protrude into the path of a revolving starting arm which engages therewith and turns the shaft in its bearing on the turret 6, itself resetting the latch in the manner set forth in the aforesaid patents. Any suitable mechanism of this character may be employed or that particular arrangement thereof to be described. Each latch mechanism as herein shown is operated by means of a spring elevated rock-lever 29, actuated by pressure upon a key 29$^a$ at its outer end. A number of these rock-levers 29 are shown corresponding in number to the types or dies upon the impressors. They may all be fulcrumed at the rear of the casing 9, for instance, by a rod 150, and may each have a push-rod 30 extending upward through an opening at the front of the casing and carrying at its upper extremity a finger-piece or key 29$^a$.

There will be as many latches or bolts in the latch mechanisms designed to actuate any single shaft 4 or 5 mounted in the turret 6 as there are types or dies upon the periphery of the impressor affixed to that particular shaft. Furthermore these latches are arranged at different distances from the point at which the types or dies operate or impression is made, for the purpose of initiating the rotary movement of the shaft at different distances from the said fixed point.

Figures 3, 9:
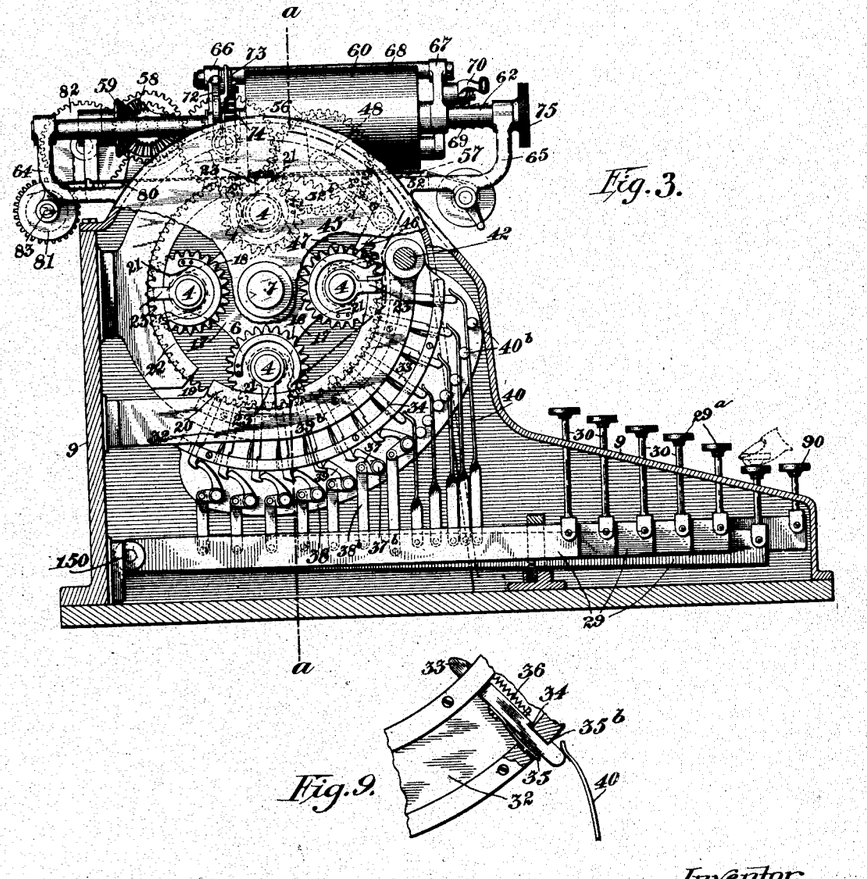
Fig. 3 is a cross section adjacent to the left-hand end of the machine as seen in Fig. 1 and looking toward the right in that figure.
Fig. 9 is an enlarged detail of the latch mechanism.

The latch mechanisms for initiating the movement of any single shaft will all be located in the same plane in which the starting arm 28 thereon swings. In Fig. 3 there are shown twelve separate latches substantially in the same plane, but of course this number may be increased or diminished according to the number of types or dies it is desired that each impressor shall have.

Each series of latches for operating any one shaft may conveniently be located in a latch frame 32, so formed and located as to permit the inner ends of the latches or bolts 33 to be arranged circularly or concentrically with respect to the axis of the turret 6. Each latch mechanism comprises a bolt or latch 33 which may be fitted to slide through suitable openings in the latch frame toward and away from the turret axis. Each latch in the present instance is held in its inoperative or retracted position by a notch 34 thereon, which fits over the edge of an opening in the latch frame, and prevents the latch from being thrown inward under the tension of spring 35 by reason of the contact of the side of this notch with the shoulder 35$^b$ in the latch frame opening. A spring 36 normally holds this notch 34 pressed against the shoulder 35$^b$ of the opening in the frame, but the opening is wide enough to permit a sufficient lateral movement of the latch when the notch is pressed away from the shoulder for the latch to clear the latter.

Suitable intermediate devices are inserted between each rock-lever 29 and its corresponding latch or bolt 33. As shown in Fig. 3, some of these intermediate devices comprise each an angle lever 37 pivoted to a stud 37$^b$, extending from a projecting flange 38 of the latch frame, one of the arms of the angle lever being connected to its corresponding rock-lever 29 by a link 38$^b$, while the other arm of said angle lever is made in the form of a finger 39, which passes over a projecting toe 39$^b$ on the latch. A downward movement of a finger 39 presses the notch 34 away from the shoulder 35$^b$ and permits the latch to be thrown inward. Others of the latch mechanisms are shown as constructed to have their latches tripped by means of a corresponding finger 40 pivoted or otherwise connected to a rock-lever 29 and guided by pins 40$^b$ on opposite sides thereof, while its angularly-extending upper end lies above the outer end of the latch and operates similarly to the contacting end of the angle lever 37.

The various rock-levers 29, angle-lever 37, links 38$^b$ and fingers 40 are made of such form and dimensions as will permit the motions of the several rock-levers when lying side by side as shown, to be transmitted to and serve to operate the latches or bolts arranged in a plane. The several latch frames 32 for supporting the several sets of latch mechanisms may be conveniently held in place upon a rod 42 extending from end to end of the machine.

A step-by-step motion or a motion of any other character to properly feed the material whose surface is to be impressed or acted upon, may be imparted to such material by any suitable means, or that herein shown which is designed to accomplish a step-by-step or intermittent movement.

Supported at the end of a swinging lever 45 is a floating arm 46 provided with a laterally-extending pin 47, which contacts with a shoulder upon a feed wheel or disk for the purpose of accomplishing such feeding movement. Normally (assuming that the turret 6 is rotating but that no impressor has been shifted into the operative plane to effect an impression) there is no contact of this pin 47 with the shoulder upon the feed wheel or disk, but when an impressor has been shifted into the operative plane contact will be made some time during the orbital and rotary movement of the impressor between a shoulder upon the corresponding feed wheel or disk and the pin or projection 47 for the purpose specified.

Figure 10:
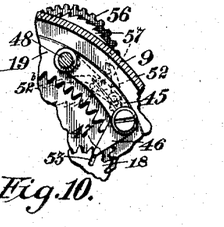
Fig. 10 is partly an end elevation of the machine as seen from the right of Fig. 1, and partly a section taken adjacent to the opposite end of the machine, the better to show the features of the feed device.

There is a swinging lever 45 and a floating arm 46 supplied with a pin 47 for each of the sets of impressors upon opposite sides of the operative plane, and each swinging lever 45 is affixed to a rock-shaft 48 mounted in suitable bearings which may be supported from the casing 9. These two rock-shafts 48 and 48 are rigidly connected with each other by suitable means, which, in the present instance, as certain of the parts to be later described, are located in a depression in the upper surface of the casing 9, consists of two offset arms 49—49 at the ends of a rod 49$^b$. The rotation of the two rock-shafts 48—48 in one direction past a certain point is prevented by a stop 50, while a spring 51 constantly urges the connected shafts to this limiting position. These connected shafts will be hereinafter designated as the rock-shaft 48. Normally, or while the rock-shaft 49 is in its limiting position and is not being turned in its bearings, the direction taken by floating arm 46 may be, if a feed before impression is desired, as shown in Fig. 10, where it is seen pointing on that side of the turret axis which is moving toward it when the turret is rotating. The floating arm 46, however, may not only be moved upward in the manner pointed out below to turn the rock-shaft 48, but may also be deflected from its normal position relatively to the lever 45, being designed to return to such normal position when free to do so.

To cause it to assume its normal position when deflected, it may be provided with an elastic finger 52 confined between stops 52$^b$—52$^b$.

The feed disks or wheels mentioned as coöperating with the pins 47—47 for the two sets of shafts may be formed upon separate and independent disks attached to the several shafts 4 and 5 of the two sets or the gearwheel 18 upon each shaft may perform the function of such feed disk as herein illustrated.

The shoulder stated as co-acting with a pin 47 may be formed as shown by notching the radial face of each gear-wheel as indicated at 53, or such shoulder may be formed by the bottom of the gear-wheel tooth, which, for the purpose, may be regarded as a notch.

Each floating arm 46 is arranged adjacent to that set of feed-wheels or gear-wheels with which it is designed to coöperate and upon that side of the gear-wheels toward which they are shifted in order to engage with the driver 19, for it is during this endwise or axial movement that contact of a pin 47 takes place with a shoulder on a feed or gear wheel.

The lateral flexibility of the pin 47 permits it to readily seat itself in the bottom of a notch, whereupon further orbital and rotary movement of the gear-wheel 18 causes the elevation of the floating arm from which the pin extends and the consequent partial rotation of the rock-shaft 48 with which it communicates. Subsequently as the wheel continues its double circular movement the pin 47 is rolled out of its notch, the floating arm 46 simultaneously deflecting, with reference to the swinging lever 45, while finally the spring 51 and finger 52 return the parts to their original or normal positions. A movement of the floating arm 46 takes place each time the engagement of a gear-wheel 18 with its driver 19 occurs, and hence a feeding movement results for each movement of the impressor into the operative plane. A variation in the amount or degree of this feeding movement desired, for instance, where a number of types or dies of varying width are used, may be secured by altering the radial depth of the notches upon the feed-wheel, resulting thereby in the turning of the rock-shaft 48 through different areas. It will be understood that contact of a pin 47 with a particular notch 53 corresponds to the appearance of a particular character at the fixed point. Intermittent motion is imparted to a feed-shaft 54, here shown as being arranged on the top of the casing 9, from the rock-shaft 48 by means of a system of gears 56 at the side of the casing, embodying a pawl and ratchet mechanism 57 and bevel-gears 58 and 59.

The present embodiment of the invention being shown as a typewriting-machine, the printing platen may be in the form of a rotary cylinder 60, guided to move with its companion pressure rollers 61—61, endwise along guide-bars 62 and 63 entering stationary brackets 64 and 65, which extend upward from the casing 9.

For the purpose of permitting an endwise feeding movement of the rotary platen 60 and the presser rollers 61—61, they may lie between side frames 66 and 67, secured together by a stretcher-rod 68. The feed-shaft 54 may be of any appropriate construction to effect a desired endwise intermittent feeding movement of the rotary platen 60. As shown it is formed with a ratchet thread 69 with which engages an arm 70, extending from the frame 67. This arm 70 will preferably be pivoted to the frame 67 and be pressed down into engagement with the feed-screw 69, by a spring 71, for instance, which will permit a disengagement from the feed-screw by exerting a pressure upon the outer end of the arm 70. The platen 60 may have the usual return spring, (not shown) while the inclined surface of the ratchet feed-screw 69 allows the arm 70 to slide endwise of the feed-shaft when the platen is pushed along its guides.

A ratchet mechanism is provided for imparting a step-by-step rotation to the platen 60 and may comprise a pawl-operating handle 72, carrying a spring-pressed pawl 73, engaging with a ratchet wheel 74, affixed to the platen or an extension thereof, while a more or less continuous rotary movement may be given to the platen manually by means of a thumb-wheel 75 secured to the guide bar 62, which is mounted for the purpose to turn in the end brackets 64 and 65, and is provided with a longitudinal groove 76, into which extends a pin 77 projecting from the platen 60. A retaining detent is indicated by 78 for holding the platen in a desired rotarial position, and a paper guide 79 may be supplied.

The usual inking ribbon is indicated by 80, the take-up roller 81 of the mechanism being driven in any suitable manner, for instance, as here shown through a system of gears 82, from a part actuated by the feed-operating mechanism. Preferably the take-up roller 81 has a frictional attachment with its driving shaft 83 to permit of a reverse movement of the roller around the moving shaft when the ribbon is wound back upon its supply roller 84 by means of the crank 85. The supply roller 84 may also be prevented by suitable means from turning too freely. These requirements are usually fulfilled by the ordinary inking ribbon device, and need not be here more fully described.

It has been stated that the types or dies upon each impressor is different from the types or dies upon any other. If this is the case it may happen that upon tripping the latch mechanism to permit its latch 33 to intrude into the path of the corresponding starting arm 28, that that particular arm has just passed the point at which it would be actuated and set in motion. It will not, therefore, enter upon its separate rotary motion until it has again reached the projecting latch, making thus very nearly a complete revolution about the axis of the turret 6. It may, however, be advisable to reduce this possible maximum period elapsing from the time of the manipulation of a latch mechanism until the impression shall be made, and for this purpose any impressor in a set on one side or the other of the operative plane may have a duplicate in that set. Such is the idea involved in the construction set forth to the left hand of Fig. 4, in which the four impressors are arranged in two pairs of duplicates, the impressors in each pair being on diametrically-opposite sides of the turret.

The starting arms 28—28 upon any pair of duplicate impressors will then need to be in the same plane perpendicular to the axis of rotation of the turret in order to be conveyed into a position where they may be actuated by the same set or row of latch mechanisms. Arranged in this manner, should a latch 33 have been thrown inward after the starting arm 28 has passed, the arm of the duplicate impressor will be actuated and thus the necessity of the starting arm which has just left the actuated latch mechanism making a complete revolution before the desired impression can be made will be avoided.

The customary spacing key is indicated by 90 which operates through an intervening rock-lever 29 and latch mechanism to effect the shifting of a shaft 4 or 5 in one set or the other toward the operative plane. Although a feeding movement will take place in the manner already described, the relation between the positions of the types or dies upon the particular impressor caused to rotate and the time at which such spacing key latch mechanism causes the impressor to begin its rotation is such as to bring a blank space instead of a type or die in juxtaposition to the platen.

Figure 11:
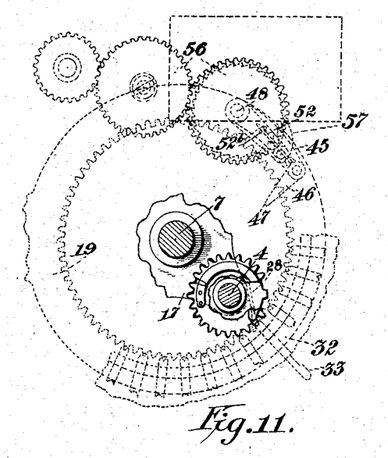
Figs. 11, 12, 13 and 14 are diagrammatic views showing a shaft carrying a gear-wheel in various positions assumed by them during their orbital and rotary movements.
Figure 12:
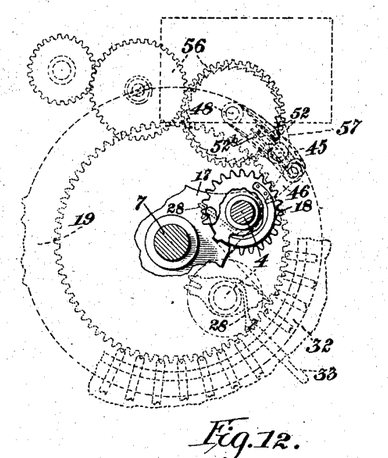
Figure 13:
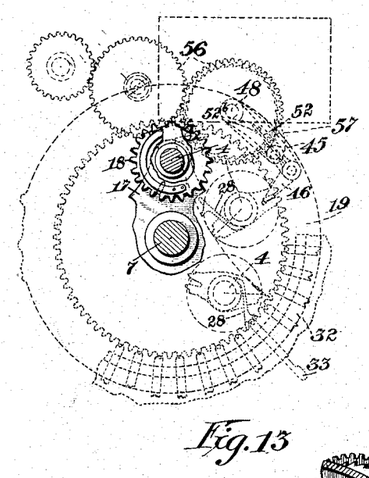
Figure 14:
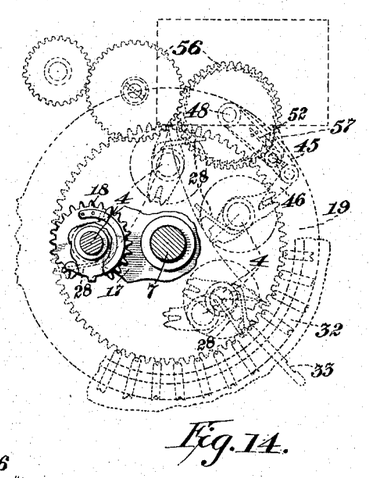

Constructed and organized according to the foregoing the procedure of operation may be briefly described as follows: Assuming that a key has been depressed thereby actuating the rock-lever 29 to which it is attached, the corresponding latch 33 is permitted to be thrown inward by the attached spring 35, and the first starting arm 28 in the plane of that latch to reach it will engage with its end, as shown in Fig. 11, in which the gear-wheel 18 affixed to the starting arm shaft 4 or 5 is exhibited in full lines, while the other parts are indicated in dotted lines. The continued rotation of the turret 6 causes the engaged starting arm to swing around carrying its shaft with it. Cam arm 21 attached to the shaft is simultaneously turned into a position where it contacts with the inclined surface of the cam 20 shifting through their co-action the gear-wheel 18, its shaft and attached impressor endwise and the impressor into the operative plane, whereupon the gear-wheel 18 meshes with the driver 19. The detent 101 has sprung into the groove 102 and maintains the parts in this axial position. Rotation of the shaft now takes place during the further rotation of the turret, the continued swinging of the starting arm 28 having in the meantime reset the latch 33, until that type or die of the impressor 2 or 3 to which the particular key operated is referable has reached the platen 60 or fixed point where it is designed that the type or die shall operate. The latter now rolls around upon the surface of the object there placed and the impression is made, see Fig. 13. Just before reaching this point, however, (see Fig. 12) the pin 47 has entered a predetermined notch 53 upon the feed-wheel whose function is performed as already explained by the gear-wheel 18, and the rock-shaft 48 is turned, causing a feed in the manner already described. As soon as the pin 47 is free from the particular notch into which it enters to effect the feed, the shaft 48, &c., are returned to their normal positions by the springs 51 and 53. Soon after this the cam arm 23 engages with the cam 22, and the impressor shaft being free to move endwise is shifted back to its original position, the retaining detent 101 springing back into the groove 103, (see Fig. 16). Gear-wheel 18 is simultaneously withdrawn from the driver 19, and the shaft brought to rest in its normal position by the brake plunger 24 sliding onto the facet 26 assisted to some degree by the action of the detent as aforesaid. Simultaneously the impressor has been withdrawn from the operative plane, leaving a space for the entrance of the impressor of the opposite set, should one in that set be the next to respond to the tripping of a latch 33 for the purpose of causing the operation of a second type or die.

Having described my invention, I claim—

1. The combination, with a carrier adapted to travel in a path having the form of a closed circuit, and parts mounted thereon which are adapted to move toward and away from a plane extending between them, of means for causing the movement of a part toward and away from said plane.

2. The combination, with a rotary carrier or turret, and parts mounted thereon which are adapted to move toward and away from a plane extending between them, of means for causing the movement of a part toward and away from said plane.

3. The combination, with a rotary carrier or turret, and parts mounted thereon which are adapted to move toward and away from a plane extending between them, of means located upon one side of the said plane for causing the movement of a part toward and away from said plane, and means located upon the other side of said plane for causing a similar movement of another part.

4. The combination with a rotary carrier or turret and impressors mounted thereon which are adapted to move toward and away from a plane extending between them, of means for causing the movement of an impressor toward said plane to make an impression at a fixed point in said plane and for moving the impressor away from this operative position.

5. The combination, with a rotary carrier or turret, and impressors in duplicate mounted thereon which are adapted to move toward and away from a plane extending between them, of means for causing the movement of an impressor toward said plane to make an impression at a fixed point in the plane and for moving the impressor away from this operative position.

6. The combination, with a rotary carrier or turret, and impressors mounted thereon which are adapted to move toward and away from a plane extending between them, of means for causing the movement of an impressor toward said plane to make an impression at a fixed point in the plane and for moving the impressor away from this operative position; and means for rotating said impressor about its own axis.

7. The combination, with a rotary carrier or turret, and impressors mounted thereon which are adapted to move toward and away from a plane extending between them, of means for causing the movement of an impressor toward said plane to make an impression at a fixed point in the plane and for moving the impressor away from this operative position; and means for causing the impressor to rotate different amounts when the same shall have reached said fixed point.

8. The combination, with a rotary carrier or turret, and impressors mounted thereon which are adapted to move toward and away from a plane extending between them, of means for causing the movement of an impressor toward said plane to make an impression at a fixed point in the plane and for moving the impressor away from this operative position; and selective devices for causing the rotation of said impressor and for causing any particular type or die thereon to operate at said fixed point.

9. The combination, with a rotary carrier or turret, and impressors mounted thereon which are adapted to move toward and away from a plane extending between them, of means for causing the movement of an impressor toward said plane to make an impression at a fixed point in the plane and for moving the impressor away from this operative position; and selective devices comprising latch mechanisms for causing the rotation of said impressor and for causing any particular type or die thereon to operate at said fixed point.

10. The combination, with a rotary carrier or turret, shafts mounted thereon which are adapted to move toward and away from a plane extending transversely between them, and impressors secured to said shafts, of means for causing the movement of a shaft and its impressor toward and away from said plane.

11. The combination, with a rotary carrier or turret, oppositely-extending shafts mounted thereon which are adapted to move toward and away from a plane extending transversely between them, and impressors secured to said oppositely-extending shafts, of means for causing the movement of a shaft and its impressor toward and away from said plane.

12. The combination, with a rotary carrier or turret, two sets of oppositely-extending shafts mounted thereon which are adapted to move toward and away from a plane extending transversely between them, and impressors secured to said two sets of oppositely-extending shafts, of means for causing the movement of a shaft and its impressor toward and away from said plane.

13. The combination, with a rotary carrier or turret, two sets of oppositely-extending shafts mounted thereon, and impressors secured to said shafts and which are adapted to move toward and away from a plane extending between them, of means for causing the movement of an impressor toward and away from said plane and for rotating the impressor; and a latch mechanism for causing any particular type or die upon an impressor to operate at a given point in the plane.

14. The combination, with a rotary carrier or turret, oppositely-extending shafts mounted thereon which are adapted to move toward and away from a plane extending between them, and impressors secured to said shafts, of gear-wheels also secured to said shafts; a driver for rotating the gear-wheels; a starting arm attached to each shaft; and means for coöperating with a starting arm to initiate the rotary movement of a shaft.

15. The combination, with a rotary carrier or turret, oppositely-extending shafts mounted thereon which are adapted to move toward and away from a plane extending between them, and impressors secured to said shafts, of gear-wheels also secured to said shafts; a driver for rotating the gear-wheels; a starting arm attached to each shaft; means for coöperating with a starting arm to initiate the rotary movement of a shaft; and means for bringing a rotating shaft to rest in a definite position.

16. The combination, with a rotary carrier or turret, oppositely-extending shafts mounted thereon which are adapted to move toward and away from a plane extending between them, and impressors secured to said shafts, of gear-wheels also secured to said shafts; a driver for rotating the gear-wheels; a starting arm attached to each shaft; means for coöperating with a starting arm to initiate the rotary movement of a shaft; means for bringing a rotating shaft to rest in a definite position; and means for retaining a shaft in its different axial positions.

17. The combination, with a rotary carrier or turret, oppositely-extending shafts mounted thereon which are adapted to move toward and away from a plane extending between them, and impressors secured to said shafts, of gear-wheels also secured to said shafts; a driver for rotating the gear-wheels; a starting arm attached to each shaft; means for coöperating with a starting arm to initiate the rotary movement of a shaft; means for bringing a rotating shaft to rest in a definite position; and means including grooves having inclined faces and a coöperating detent for retaining a shaft in its different axial positions.

18. The combination, with a rotary carrier or turret, shafts mounted thereon which are adapted to move toward and away from a plane extending transversely between them, and impressors secured to said shafts, of means comprising cams and cam arms for causing the movement of an impressor toward and away from said plane.

19. The combination, with a rotary carrier or turret, and an impressor mounted thereon which is adapted to move endwise or axially of said turret, of a feed-wheel moving in unison with the impressor and brought into an operative axial position simultaneously with the movement of the impressor to a similar position.

20. The combination, with a rotary carrier or turret, an impressor, a gear wheel, and a shaft upon which the impressor and gear wheel are mounted and which shaft is adapted to move endwise or axially of said turret, of a feed-wheel moving in unison with said gear-wheel and brought into operative axial position simultaneously with the movement of the gear-wheel to a similar position.

21. The combination, of a rotary carrier or turret, an impressor mounted thereon which is adapted to move endwise or axially of the turret, and a feed-wheel connected with the impressor, of a feed mechanism embracing a pin or projection adapted to engage with a shoulder upon the feed-wheel in an axial position of the impressor.

22. The combination, of a rotary carrier or turret, an impressor mounted thereon which is adapted to move endwise or axially of the turret, and a feed-wheel connected with the impressor, of a feed mechanism embracing a rock-shaft and a pin or projection adapted to engage with a shoulder upon the feed-wheel in an axial position of the impressor.

23. The combination, with a rotary carrier or turret, and an impressor mounted thereon which is adapted to move endwise or axially of said turret, of a feed-wheel consisting of a gear-wheel moving in unison with the impressor and brought into an operative axial position simultaneously with the movement of the impressor to a similar position.

24. The combination, with a rotary carrier or turret, and an impressor mounted thereon which is adapted to move endwise or axially of said turret, of a feed-wheel moving in unison with the impressor and brought into an operative axial position simultaneously with the movement of the impressor to a similar position, said feed-wheel having shoulders at varying distances from the center.

25. The combination, of a rotary carrier or turret, an impressor mounted thereon which is adapted to move endwise or axially of the turret, and a feed-wheel connected with the impressor, of a feed mechanism embracing a pin or projection adapted to engage with a shoulder formed by a notch upon the feed-wheel in an axial position of the impressor.

26. The combination, of a rotary carrier or turret, an impressor mounted thereon which is adapted to be moved endwise or axially of the turret, and a feed-wheel connected with the impressor, of a feed mechanism comprising an arm having a pin or projection thereon adapted to engage with a shoulder upon the feed-wheel; a lever to which the arm is connected; and a rock-shaft from which the lever extends.

27. The combination with oppositely disposed mechanically separable parts, of means for selectively shifting said parts in various relations to each other.

28. The combination with oppositely disposed impression device carriers; of a rotatable main carrier upon which such impression device carriers are mounted, and means for selectively shifting the carriers, the one towards the other.

29. The combination with oppositely disposed impression device carriers, and a rotatable main carrier; of means for selectively causing any one of the impression devices to move rotatorily to a position in line with the impression point and the impression device carrier upon which the selected impression device is mounted to move axially into the plane of such point.

30. The combination with oppositely disposed impression device carriers disposed in the same longitudinal plane of a main carrier upon which such impression device carriers are mounted, and means for selectively shifting the impression device carriers one toward the other.

31. The combination with oppositely disposed impression device carriers disposed in the same longitudinal plane of a main carrier upon which such impression device carriers are mounted, and means for selectively shifting the impression device carriers one toward the other at a time.

32. The combination with oppositely disposed impression device carriers located in substantially the same longitudinal plane of means for selectively causing any one of the impression devices to move rotatorily to a position in line with the impression point and the impression device carrier upon which the selected impression device is mounted to move axially into the plane of such point.

33. The combination with normally separated, rotatable parts, of mechanism for selectively rotating and shifting said parts one at a time toward the other.

34. The combination with mechanically separated, rotatable parts, of a main carrier upon which such parts are mounted, and mechanism for selectively rotating and shifting said parts toward each other, one at a time.

35. The combination with mechanically separated, rotatable parts, of mechanism for selectively rotating and shifting said parts toward each other, one at a time, and detents for holding said parts in predetermined positions as respects their distance from each other.

36. The combination with mechanically separated, rotatable parts, of a main carrier upon which such parts are mounted, mechanism for selectively rotating and shifting said parts toward each other, one at a time, and detents for holding said parts in predetermined positions as respects their distance from each other.

37. The combination with mechanically separated, rotatable parts, of mechanism for selectively rotating and shifting said parts toward each other, one at a time, detents for holding said parts in predetermined positions as respects their distance from each other, and detents for also holding said parts in predetermined angular positions.

38. The combination with mechanically separated, rotatable parts, of a main carrier upon which such parts are mounted, mechanism for selectively rotating and shifting said parts toward each other, one at a time, detents for holding said parts in predetermined positions as respects their distance from each other, and detents for also holding said parts in predetermined angular positions.

39. The combination with normally separated, rotatable parts, of mechanism for selectively rotating said parts through various predetermined angles and for shifting the parts one at a time toward the other.

40. The combination with normally separated, rotatable parts, of a main carrier upon which such parts are mounted, and mechanism for selectively rotating said parts through various predetermined angles and for shifting said parts one at a time toward the other.

41. The combination with normally separated, rotatable parts, of mechanism for selectively rotating said parts through various predetermined angles and for shifting said parts one at a time toward the other, and detents for holding said parts in predetermined positions as respects their distance from each other.

42. The combination with normally separated, rotatable parts, of a main carrier upon which such parts are mounted, mechanism for selectively rotating said parts through various predetermined angles and for shifting said parts one at a time toward the other, and detents for holding said parts in predetermined positions as respects their distance from each other.

43. The combination with normally separated, rotatable parts, of mechanism for selectively rotating said parts through various predetermined angles and for shifting said parts one toward the other one at a time, detents for holding said parts in predetermined positions as respects their distance from each other, and detents for also holding said parts in predetermined angular positions.

44. The combination with normally separated, rotatable parts, of a main carrier upon which such parts are mounted, mechanism for selectively rotating said parts through various predetermined angles and for shifting said parts one at a time toward the other, detents for holding said part in predetermined positions as respects their distance from each other, and detents for also holding said parts in predetermined angular positions.

45. The combination with normally separated, rotatable parts, of means for selectively initiating the rotations of said parts, means brought into action by the initiation of the rotation of a part for continuing its rotation, a device for throwing the latter mentioned means out of action upon the completion of a predetermined angle of rotary movement, and means for selectively shifting said parts one at a time toward the other.

46. The combination with mechanically separated, rotatable parts, of means for selectively initiating the rotations of said parts, means brought into action by the initiation of the rotation of a part for continuing its rotation, a device for throwing the latter mentioned means out of action upon the completion of a predetermined angle of rotary movement, and means for selectively shifting said parts toward each other, one at a time.

47. The combination with normally separated rotatable and shiftable parts, of means for rotating said parts, means for shifting said parts one toward another, and means for actuating the rotating and shifting means selectively relatively to said parts.

48. The combination with a plurality of series of shafts, means for revolving these about a common axis, a working head carried by each of said shafts and normally out of the working position, and means for selectively moving one of said heads out of the plane of the heads of its series and toward the heads of the other series and into working position.

49. The combination with a series of carriers, means for revolving these in a plane parallel with the working plane, and means for selectively shifting said heads into the working plane.

50. The combination with a carrier, means for moving said carrier through a path having the form of a closed circuit, and parts carried thereby and movable toward and away from a plane extending between their position, and means for effecting movement toward and away from said plane.

51. The combination with a rotary carrier or turret and parts mounted thereon for movement toward and away from a plane extending between these, and means for effecting said movement.

52. The combination with a rotary carrier or turret, a plurality of parts mounted thereon for movement toward and away from the medially disposed plane, means located upon one side of said plane for effecting the movement of a selected part toward and away from said plane, and means located upon the other side of said plane for effecting similar movement of another selected part.

53. The combination with a rotary carrier or turret, impressers in duplicate mounted thereon, and movable toward and away from a medially disposed plane, means for effecting the movement of a selected impresser toward said plane and into a fixed relation to a fixed working point, and means for returning the impresser to its idle position.

54. The combination with a rotary carrier or turret, two sets of oppositely extending shafts mounted thereon and movable toward and from a medially disposed plane, impressers carried by said shafts, and means for effecting the movement of a shaft and its impresser into and out of said plane.

55. The combination with a rotary carrier or turret, an impresser mounted thereon for endwise movement axially of the turret, a feed wheel connected with the impresser, and a feed mechanism embracing a pin or projection for engaging with a shoulder upon the feed wheel in the predetermined axial position of the presser.

56. The combination with a rotary carrier, of oppositely disposed mechanically separable parts rotatably mounted on the carrier, and mechanism for selectively shifting said parts upon the carrier one toward the other.

57. The combination with rotary parts disposed in axial parallelism and normally separated, of means for axially shifting each of these toward the other, and means for selectively actuating the shifting means.

58. The combination with a plurality of oppositely disposed rotary impression device carriers, of means for selectively axially shifting the carriers one toward the other.

FRANCIS H. RICHARDS.

Witnesses:
 FRED. J. DOLE,
 C. E. VOSS.